United States Patent [19]

Horecky et al.

[11] Patent Number: 4,609,539

[45] Date of Patent: Sep. 2, 1986

[54] PROCESS FOR SIMULTANEOUSLY REMOVING SULFUR OXIDES AND PARTICULATES

[75] Inventors: Carl J. Horecky, Elmhurst; Eugene H. Hirschberg, Park Forest, both of Ill.

[73] Assignee: Standard Oil Company (Indiana), Chicago, Ill.

[21] Appl. No.: 640,679

[22] Filed: Aug. 13, 1984

[51] Int. Cl.$^4$ .......................... B01J 8/00; C01B 17/00; C01B 21/02; C10G 11/02
[52] U.S. Cl. .................................... 423/244; 423/239; 423/563; 423/573 G; 208/113; 208/120; 55/73
[58] Field of Search ................ 423/244 A, 244 R, 239, 423/235, 563, 239 A, 573 G, 576; 208/113, 120; 55/73

[56] References Cited

U.S. PATENT DOCUMENTS

| | | | |
|---|---|---|---|
| 2,551,905 | 5/1951 | Robinson | 423/244 |
| 3,752,877 | 8/1973 | Beavon | 423/573 |
| 3,985,861 | 10/1976 | Hudson | 423/573 |
| 4,238,317 | 12/1980 | Vasalos et al. | 208/120 |
| 4,423,019 | 12/1983 | Bertolacini et al. | 423/244 |

Primary Examiner—Gregory A. Heller
Attorney, Agent, or Firm—Thomas W. Tolpin; William T. McClain; William H. Magidson

[57] ABSTRACT

A process is provided in which particulates and sulfur oxides are simultaneously removed from flue gases in a granular bed filter and scrubber with special sulfur oxide-capturing and particulate-removing material. The spent sulfur oxide-capturing and particulate-removing material can be regenerated in a lift pipe riser.

17 Claims, 5 Drawing Figures

PROCESS FOR SIMULTANEOUSLY REMOVING SULFUR OXIDES AND PARTICULATES

BACKGROUND OF THE INVENTION

This invention relates to flue gas cleanup and, more particularly, to removing sulfur oxides and particulates from a gaseous stream, such as from a regenerator in a catalytic cracking unit.

Flue gases emitted in combustors, such as in regenerators and power plants, often contain undesirable levels of sulfur oxides (SOx), nitrogen oxides (NOx), and particulates which, if untreated, might pollute the atmosphere.

Sulfur oxides in the presence of water can form sulfuric acid causing acid rain. Nitrogen oxides may cause smog by photochemical reaction with hydrocarbons in the atmosphere. Particulates in flue gases typically include ash (soot) and/or spent combusted catalyst with trace metals, such as arsenic and other contaminants which, in excessive levels, could poison vegetation and livestock.

Over the years, various methods have been suggested for controlling and/or removing sulfur oxide and/or nitrogen oxide emissions. In catalytic cracking units, sulfur oxide control processes usually occur in the regenerator. In one widely used process, sulfur oxides are reacted in the regenerator in the presence of a catalyst to form hydrogen sulfide which is withdrawn with the product stream from the catalytic cracker and subsequently treated in a sulfur recovery plant. Some of the methods suggested for removing nitrogen oxides in regenerators, however, poison the cracking catalyst and are, therefore, unacceptable. Typifying these prior art methods for controlling sulfur oxide and/or nitrogen oxide emissions are those described in U.S. Pat. Nos. 2,493,218; 2,493,911; 2,522,426; 2,575,520; 2,863,824; 2,992,895; 3,023,836; 3,068,627; 3,264,801; 3,501,897; 3,755,535; 3,760,565; 3,778,501; 3,832,445; 3,835,031; 3,840,643; 3,846,536; 3,892,677; 4,001,376; 4,006,066; 4,039,478; 4,153,534; 4,153,535; 4,181,705; 4,206,039; 4,218,344; 4,221,677; 4,233,276; 4,238,317; 4,241,033; 4,254,616; 4,258,020; 4,267,072; 4,300,997; 4,323,542; 4,325,811; 4,369,109; 4,369,130; 4,376,103; 4,381,991; 4,405,443; 4,423,019; and 4,443,419. These prior art methods have met with varying degrees of success.

Flue gas streams discharged from regenerators, power plants, or other combustors are commonly directed through one or more dedusters, such as flue gas scrubbers, electrostatic precipitators, cyclones, bag houses, granular bed filters, or other filters, in order to remove particulates from the flue gas stream. Typifying these dedusters and other prior art particulate-removing devices are those shown in U.S. Pat. Nos. 3,540,388; 3,550,791; 3,596,614; 3,608,529; 3,608,660; 3,654,705; 3,672,341; 3,696,795; 3,741,890; 3,769,922; 3,818,846; 3,882,798; 3,892,658; 3,921,544; 3,922,975; 4,017,278; 4,126,435; 4,196,676; and 4,421,038. These dedusters and prior art devices have met with varying degrees of success.

The combined use of flue gas scrubbers and electrostatic precipitators, while often effective to control particulate emissions, is very expensive and cumbersome.

It is therefore desirable to provide an improved process to remove sulfur oxides and particulates from gaseous streams.

SUMMARY OF THE INVENTION

An improved process is provided for efficiently, effectively, and economically removing sulfur oxides (SOx) and particulates from gaseous streams, such as flue gases, to minimize emission of pollution and contaminants into the atmosphere. The novel process is particularly useful to clean up combustion off-gases emitted from regenerators of catalytic cracking units to environmentally acceptable levels. The process is also beneficial to effectively remove sulfur oxides and particulates from combustion gases emitted from synthetic fuel plants, such as those which retort, solvent extract, or otherwise process oil shale, tar sands, diatomaceous earth (diatomite), uintaite (gilsonite), lignite, peat, and biomass, as well as to effectively remove sulfur oxides and particulates emitted from coal liquefaction and gasification plants. The disclosed process is also useful to clean up flue gases from power plants, paper mills, steel mills, waste (garbage) treatment sites, chimneys, smoke stacks, etc. The process is also useful for removing nitrogen oxides (NOx) from gaseous streams.

To this end, sulfur oxide, nitrogen oxide, and particulate-laden gases are treated and purified in a single processing vessel, preferably a granular bed filter and scrubber, located downstream of the combustor to remove simultaneously sulfur oxides, nitrogen oxides, and particulates from the gases. In the processing vessel, the particulates, nitrogen oxides, and sulfur oxides are simultaneously removed from the dusty sulfur and nitrogen oxide-containing gases by passing the gases through at least a portion of a bed of sulfur oxide-capturing, nitrogen oxide-capturing, and particulate-removing material. Desirably, the gases are fed into the vessel and passed through the portion of the bed at an angle of inclination from 30° to 90° relative to the horizontal axis of the vessel and most preferably vertically downwardly at right angles (perpendicular) to the horizontal axis for best results.

Preferably, the bed of sulfur oxide-capturing, nitrogen oxide-capturing, and particulate-removing material is a downwardly moving bed of granular material in the form of balls, spheres, pebbles, or pellets. The preferred granular material is alumina adsorbers, although adsorbers comprising oxides of other metals can also be used, either alone or in combination with alumina and/or each other, such as bismuth, manganese, yttrium, antimony, tin, rare earth metals, Group 1a metals, and/or Group 2a metals.

The adsorbers can be coated with a catalyst that promotes the removal of sulfur oxides. While the preferred catalyst is platinum, other catalytic metals, both free and in a combined form, can be used, either alone or in combination with platinum and/or each other, such as rare earth metals, Group 8 metals, chromium, vanadium, rhenium, and combinations thereof.

The spent material (adsorbers) containing the captured particulates and sulfur oxides can be regenerated, such as in a lift pipe riser or transfer line, to remove the sulfur oxides and particulates from the adsorbers. The regenerated adsorbers can be recycled to the processing vessel, with or without additional scrubbing or stripping, as desired. In one form, the adsorbers are regenerated thermally, such as by combustion or other heating means. In another form, the adsorbers are regenerated with a reducing gas to convert the sulfur oxides to hydrogen sulfide. The reducing gas can be hydrogen, ammonia, carbon monoxide, or light hydrocarbon gases, such as methane, ethane, propane, etc. The reducing gas can also be diluted with steam to attain a shift reaction or steam reforming in order to produce hydrogen and carbon dioxide. Hydrogen produced in this manner serves as a very effective and relatively inexpensive reducing gas to convert sulfur oxides to hydrogen sulfides. The hydrogen sulfide can be treated in a hydrogen sulfide treatment plant, such as an amine recovery unit and a Claus plant. The particulates in the dusty effluent gases can be removed downstream of the regenerator in one or more filters, such as a cyclone and/or bag house.

Particulates emitted from catalytic cracking units are mainly combusted spent catalyst. Particulates emitted from synthetic fuel plants are mainly combusted synthetic fuels (spent hydrocarbon-containing material). Particulates emitted from power plants, steel mills, waste treatment sites, etc., contain ash and/or other material.

As used in this application, the terms "sulfur oxide" and "sulfur oxides" mean sulfur dioxide and/or sulfur trioxide.

The term "SOx" as used herein means sulfur oxide.

The terms "nitrogen oxide" and "nitrogen oxides" as used herein mean nitric oxide (NO) and/or nitrogen dioxide ($NO_2$).

The term "NOx" as used herein means nitrogen oxide.

The terms "spend catalyst," "spent promoter," and "spent material" as used herein mean a catalyst, promoter, or material, respectively, which has been at least partially deactivated.

A more detailed explanation of the invention is provided in the following description and appended claims taken in conjunction with the accompanying drawings.

DETAILED DESCRIPTION OF THE PREFERRED EMBODIMENT

Figure 1:
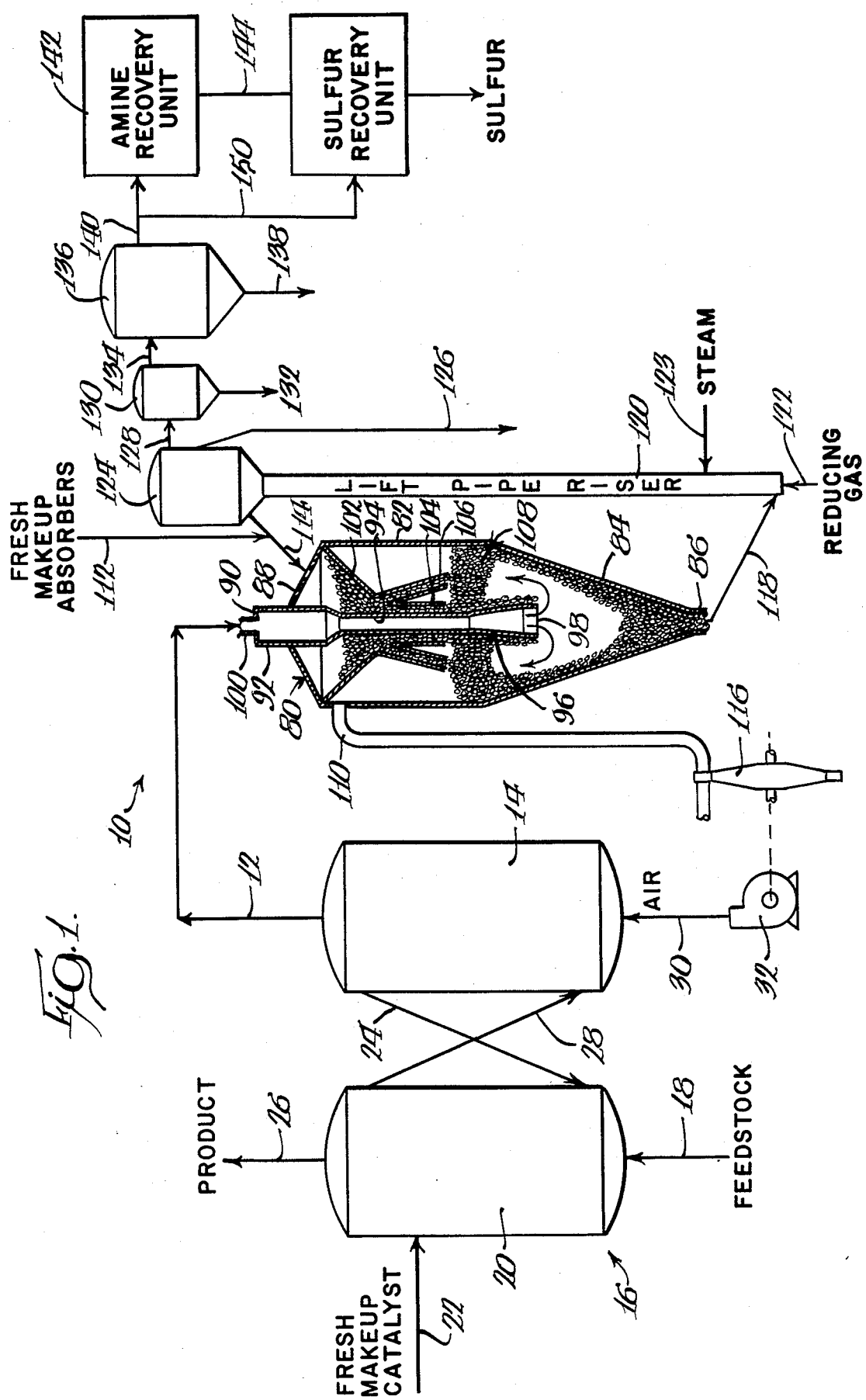
FIG. 1 is a schematic flow diagram of a gas purification process in accordance with principles of the present invention.

Referring now to FIG. 1, a gas purification process 10 is provided to remove sulfur oxides (SOx) and particulates from a gaseous stream 12, such as flue gases, to minimize emission of pollution and contaminants into the atmosphere. While the process of the present invention is described hereinafter with particular reference to cleanup of combustion off-gases emitted from the regenerator 14 of a catalytic cracking unit 16, it will be apparent that the process of the present invention can also be used to effectively clean up combustion gases (flue gases) emitted from other combustors, such as those from synthetic fuel plants, which retort, solvent extract, or otherwise process oil shale, tar sands, diatomaceous earth (diatomite), uintaite (gilsonite), lignite, peat, and biomass, coal liquefaction and gasification plants, power plants, paper mills, steel mills, waste (garbage) treatment sites, chimneys, smoke stacks, etc.

In the gas purification process of FIG. 1, a hydrocarbon feedstock, such as gas oil, is fed through feedstock line 18 into the bottom of a catalytic cracking reactor 20, such as a fluid catalytic cracker (FCC). Fresh make-up catalytic cracking catalyst and regenerated catalytic cracking catalyst are fed into the reactor through fresh make-up catalyst line 22 and regenerated catalyst line 24, respectively. In the reactor, the hydrocarbon feedstock is volatilized, gasified, and fluidized upon being mixed with the hot cracking catalyst and the feedstock is catalytically cracked to more valuable hydrocarbons. The catalytically cracked hydrocarbons are withdrawn from the top of the reactor through overhead product line 26 and conveyed to downstream processing equipment (not shown) for further upgrading, separation into fractions, and/or further processing.

Spent catalyst is discharged from the reactor through spent catalyst line 28 and fed to the bottom portion of an upright, fluidizable catalyst regenerator or combustor 14. The reactor and regenerator together provide the primary components of the catalytic cracking unit. Air is injected upwardly into the bottom portion of the regenerator through air injector line 30 by air pump 32. The air is injected at a pressure and flow rate to fluidize, propel, convey, and transport the spent catalyst particles generally upwardly through the regenerator. Residual carbon (coke) contained on the catalyst particles is substantially completely combusted in the regenerator leaving regenerated catalyst for use in the reactor. The regenerated catalyst is discharged from the regenerator through regenerated catalyst line 24 and fed to the reactor. The combustion off-gases (flue gases) are withdrawn from the top of the combustor through an overhead combustion off-gas line or flue gas line 12. The combustion off-gases or flue gases contain minute particulates of combusted spent catalyst particles as well as sulfur oxides (SOx) and nitrogen oxides (NOx). The particulates in the combustion off-gases and flue gases emitted from the regenerator of a catalytic cracking unit are very small and typically range in size from 20 microns to less than 0.1 micron. Under present government environmental standards, the particulates, SOx, and NOx in the flue gases are pollutants which must be redued to environmentally acceptable levels before the flue gases are vented to the atmosphere.

Figure 5:
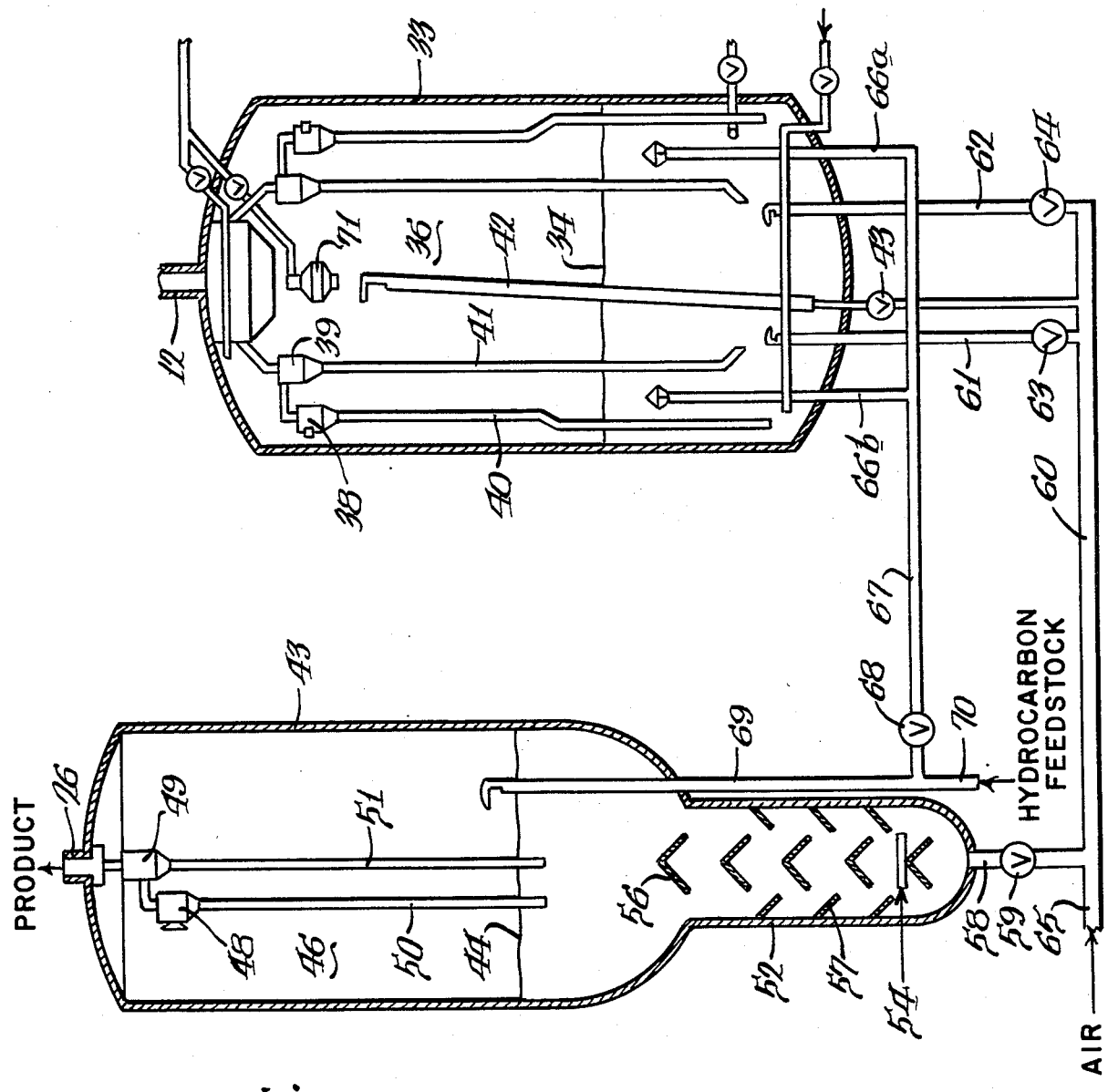
FIG. 5 is a cross-sectional view of a catalytic cracking unit.

In the regenerator 33 of FIG. 5, the regenerator has a dense phase lower section 34 and a dilute phase upper section 36 to provide for substantially complete carbon monoxide (CO) burning and combustion in the manner described by Horecky et al., U.S. Pat. No. 3,909,392, which is hereby incorporated by reference in its entirety. The regenerator can also have one or more internal cyclones 38 and 39 for removing some of the combusted particulates from combustion gases. The removed catalyst particles are discharged through dip legs or return lines 40 and 41 at the lower end of the cyclones into the dense phase lower portion 34. The regenerator can also have an eductor or eductor tube 42 to disperse the spent cracking catalyst particles in a fountain, rain, or spouted bed into the dilute phase upper portion of the regenerator, via valve 43, with the aid of air, steam, or inert gases.

As shown in FIG. 5, the catalytic cracking reactor 43 (catalytic cracker) can also have a dense phase lower portion 44 and a dilute phase upper portion 46, as well as one or more internal cyclones 48 and 49 for removing cracking catalyst particles from the gaseous product stream before the cracked product stream is removed from the reactor. Downwardly depending dip legs or return lines 50 and 51 from the internal cyclones in the reactor return the cracking catalyst particles to the lower portion of the reactor. If desired, external cyclones can be used instead of internal cyclones.

The reactor 43 can also have a steam stripping section 52 at the bottom of the reactor which is of a smaller cross-sectional area than the outer walls of the dilute and dense phase portions of the reactor. Steam is injected into the steam stripping portion 52 through steam line 54 to steam strip volatile hydrocarbons from the cracking catalyst particles. The steam also serves to fluidize the cracking catalyst in the stripping portion 52 as well as to fluidize the cracking catalyst in the lower dense phase 44 of the reactor. The steam stripping portion can have internals, such as conical baffles 56 and donuts 57, to enhance flow and steam stripping. A high temperature second stage steam stripper can also be used.

The spent catalyst can be withdrawn from the bottom of the steam stripper section through spent catalyst line 58, via control valve 59, instead of from the upper portion of the reactor, if desired, and can be transported upwardly into the lower portion of the regenerator 33 through a transfer line 60 and regenerator inlet lines 61 and 62, via inlet valves 63 and 64, with the aid of air from air injector 65. The regenerated catalyst can be withdrawn from the bottom of the regenerator 33 through regenerated catalyst lines 65 and 66, if desired, instead of from the upper portion of the regenerator and conveyed by regenerated catalyst line 67, valve 68, and reactor inlet line 69 to the dilute phase portion 46 of the reactor 43 along with the hydrocarbon feedstock from feedstock line 70. The temperature in the regenerator can be controlled by steam pod injector 71.

Suitable hydrocarbon feedstocks for the catalytic cracking unit preferably have a boiling point above the gasoline boiling range, for example from about 400° F. to about 1,200° F., and are usually catalytically cracked at temperatures ranging from about 850° F. to about 1,200° F. Such feedstocks can include various mineral oil fractions boiling above the gasoline range, such as light gas oils, heavy gas oils, wide-cut gas oils, vacuum gas oils, kerosenes, decanted oils, residual fractions (resid), reduced crude oils, and cycle oils derived from any of these, as well as suitable fractions derived from shale oil, tar sands oil, diatomaceous earth oil, coal liquefaction, or other synthetic oils. Such fractions may be employed singly or in any desired combination.

Catalytic cracking of heavy mineral oil fractions is an important refining operation in the conversion of crude oils to desirable fuel products, such as high-octane gasoline fuel used in spark-ignited, internal combustion engines. In fluid catalytic cracking, high molecular weight hydrocarbon liquids or vapors are contacted with hot, finely-divided solid catalyst particles in a fluidized bed reactor such as shown in FIG. 1 or in an elongated riser reactor such as shown in FIG. 5, and the catalyst-hydrocarbon mixtures are maintained at an elevated temperature in a fluidized or dispersed state for a sufficient period of time to obtain the desired degree of cracking to lower molecular weight hydrocarbons typically present in motor gasoline and distillate fuels.

In usual cases where riser cracking is employed for conversion of a gas oil, the throughput ratio, or volume of total feed to fresh feed, may vary from about 1 to 3. The conversion level may vary from about 40 to about 100 weight percent and advantageously is maintained above about 60 weight percent, for example, between about 60 and 90 weight percent. The term "conversion" is generally used herein as the percentage reduction by weight of hydrocarbons boiling above about 430° F. at atmospheric pressure by the formation of lighter materials or coke.

The weight ratio of total cracking catalyst-to-oil in the riser reactor (catalytic cracker) can vary within the range of from about 2 to about 20 in order that the fluidized dispersion will have a density within the range of from about 1 to about 20 pounds per cubic foot. Desirably, the catalyst-to-oil ratio is maintained within the range of from about 3 to about 20, preferably 3 to about 7 for best results. The fluidizing velocity in the riser reactor (catalytic cracker) can range from about 10 to about 100 feet per second. The riser reactor can have a ratio of length-to-average diameter of about 25.

For production of a typical naphtha product, the bottom section mixing temperature within the riser reactor (catalytic cracker) above the stripping section is advantageously maintained at about 1,000° F. to about 1,100° F. for vaporization of the oil feed so that the top section's product exit temperature will be about 950° F. For cracking resids and synthetic fuels, substantially higher mixing temperatures in the bottom section of the reactor, such as about 2,000° F., may be necessary for effective cracking.

Under the above conditions, including provision for a rapid separation of spent catalyst from effluent oil vapor, a very short period of contact between the cracking catalyst and oil will be established. Contact time within the riser reactor (catalytic cracker) will generally be within the range of from about 1 to about 15 seconds, preferably within the range of from about 3 to about 10 seconds. Short contact times are preferred because most of the hydrocarbon cracking occurs during the initial increment of contact time and undesirable secondary reactions are avoided. This is especially important if higher product yield and selectivity, including lesser coke production, are to be realized.

Short contact time between cracking catalyst particles and oil vapors can be achieved by various means. For example, cracking catalyst may be injected at one or more points along the length of a lower, or bottom, section of the riser reactor (catalytic cracker). Similarly, oil feed may be injected at all the points along the length of the lower section of the riser reactor and a different injection point may be employed for fresh and recycle feed streams. Auxiliary nozzles can also be used to disperse resids or other feedstock onto the catalyst for more efficient catalytic cracking reactions. The lower section of the riser reactor above the stripping section may, for this purpose, include up to about 80 percent of the total riser length in order to provide extremely short effective contact times inducive to optimum conversion of petroleum feeds. The reactor is preferably designed to minimize cracking of the product in the dilute phase. Where a dense catalyst bed is employed, provision may also be made for injection of cracking catalyst particles and/or oil feed directly into the dense-bed zone.

While the conversion conditions specified above are directed to the production of gasoline as fuel for spark-ignition internal combustion engines, the process may be suitably varied to permit maximum production of heavier hydrocarbon products such as jet fuel, diesel fuel, heating oil and chemicals and, in particular, olefins and aromatics.

In catalytic cracking, some non-volatile carbonaceous material, or "coke", is deposited on the catalyst particles. Coke comprises highly condensed aromatic hydrocarbons which generally contain a minor amount of hydrogen, such as from about 4 to about 10 weight percent. When the hydrocarbon feedstock contains organic sulfur compounds, the coke also contains sulfur and nitrogen. As coke builds up on the catalyst, the activity of the catalyst for cracking and the selectivity of the catalyst for producing gasoline blending stocks diminish. The catalyst particles may recover a major proportion of their original capabilities by removal of most of the coke therefrom in the catalyst regenerator.

The spent catalyst from the petroleum conversion reaction in the reactor is preferably stripped in the steam stripping section 52 (FIG. 5) prior to entering the regenerator. The stripping section for use in the fluidized bed catalytic cracker may be maintained essentially at a conversion reactor temperature in the range of from about 200° F. to about 1,200° F. and preferably above about 870° F. for best results. The preferred stripping gas is steam although steam containing a diluent, such as nitrogen or some other inert gas or flue gas, may also be employed. The stripping gas can be injected into the stripping section at a pressure of at least about 10 psig, preferably about 35 psig, to attain substantially complete removal of volatile compounds from the spent conversion catalyst. If desired, an inert stripping gas may be used instead of steam.

Catalyst regeneration is accomplished by burning the coke deposits from the catalyst surface with a molecular oxygen-containing gas, such as air. The oxidation of coke may be characterized in a simplified manner as the oxidation of carbon as shown below.

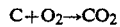  (a)

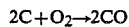  (b)

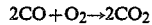  (c)

Reactions (a) and (b) both can occur under typical catalyst regeneration conditions with the catalyst temperature ranging from about 1,050° F. to about 1,450° F. or higher and are exemplary of gas-solid chemical interactions when regenerating cracking catalyst at temperatures within this range. The effect of any increase in temperature is reflected in an increased rate of combustion of carbon and a more complete removal of carbon, or coke, from the catalyst particles. As the increased rate of combustion is accompanied by an increased evolution of heat whenever sufficient free or molecular oxygen is present, the gas-phase reaction (c) may occur. This latter reaction is initiated and propagated by free radicals and can be catalyzed.

The burning of sulfur-containing and nitrogen-containing coke deposits from the catalyst also results in the formation of sulfur oxides and nitrogen oxides, and although the disclosed invention is not to be limited thereby, sulfur-compound and sulfur oxide burning may be represented by the following chemical equations:

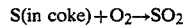  (d)

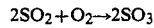  (e)

Reactions (d) and (e) also occur under typical cracking catalyst regeneration conditions. While reaction (d) is fast, reaction (e) is relatively slow. Reaction (e) can be catalyzed by any catalyst which catalyzes reaction (c) above.

Stripped deactivated cracking catalyst is regenerated by burning the coke deposits from the catalyst surface with air or some other combustion-sustaining molecular oxygen-containing regeneration gas in a regenerator. This burning results in the formation of combustion products such as sulfur oxides, carbon monoxide, carbon dioxide, and steam. The oxygen-containing regeneration gas can contain a diluent, such as nitrogen, steam, carbon dioxide, recycled regenerator effluent gases, and the like. The molecular oxygen concentration of the regeneration gas is ordinarily from about 2 to about 30 volume percent and preferably from about 5 to about 25 volume percent. Since air is conveniently employed as a source of molecular oxygen, a major portion of the inert gas can be nitrogen. The regeneration zone temperatures are ordinarily in the range from about 1,049° F. to about 1,454° F. and are preferably in the range from about 1,148° F. to about 1,355° F. Other regeneration temperatures may be used in some circumstances. When air is used as the regeneration gas, it can be injected into the bottom of the regenerator from a blower or compressor at a fluidizing velocity in the range from about 0.15 to about 5 feet per second and preferably from about 0.5 to about 3 feet per second.

Suitable cracking catalysts include those containing silica and/or alumina, including the acidic type. The cracking catalyst may contain other refractory metal oxides such as magnesia or zirconia. Preferred cracking catalysts are those containing crystalline aluminosilicates, zeolites, or molecular sieves, in an amount sufficient to materially increase the cracking activity of the catalyst, e.g., between about 1 and about 25% by weight. The crystalline aluminosilicates can have silica-to-alumina mole ratios of at least about 2:1, such as from about 2 to 12:1, preferably about 4 to 6:1 for best results.

The crystalline aluminosilicates are usually available or made in sodium form and this component can be reduced, for instance, to less than about 4 or even less than about 1% by weight through exchange with hydrogen ions, hydrogen-precursors such as ammonium ions, or polyvalent metal ions. Suitable polyvalent metals include calcium, strontium, barium, and the rare earths such as cerium, lanthanum, neodymium, and naturally-occurring rare earths and their mixtures. Such crystalline materials are able to maintain their pore structure under the high temperature conditions of catalyst manufacture, hydrocarbon processing and catalyst regeneration. The crystalline aluminosilicates often have a uniform pore structure of exceedingly small size with the cross-sectional diameter of the pores being in a size range of about 6 to 20 angstroms, preferably about 10 to 15 angstroms. Silica-based cracking catalysts having a major proportion of silica, e.g., about 60 to 90 weight percent silica and about 10 to 40 weight percent alumina, are suitable for admixture with the crystalline aluminosilicate or for use as such as the cracking catalyst. Other cracking catalysts and pore sizes can be used.

The cracking catalyst particles are finely-divided and may have an average particle size in the range of about 150 microns to about 20 microns or less.

The regeneration gas serving to fluidize the dense bed contains free or molecular oxygen and the oxygen is preferably charged to the regenerator in an amount somewhat in excess of that required for complete combustion of coke (carbon and hydrogen) to carbon dioxide and steam. The amount of oxygen in excess of that required for complete combustion of the coke may vary from about 0.1 to about 35 or more percent of the theoretical stoichiometric oxygen requirement for complete combustion of the coke but, advantageously, need not be greater than about 10 percent. For example, when air is employed as the regeneration gas, a 10 percent excess of air provides only about 2 volume percent oxygen in the effluent spent gas stream. Advantageously, the concentration of molecular or free oxygen and carbon monoxide at any point within the regenerator is maintained outside of the explosive range at those conditions to eliminate any risk of detonation.

An oxidation-promoting, carbon monoxide-burning catalyst can be fed to the regenerator to promote complete burning of carbon monoxide to carbon dioxide in the regenerator. The solid oxidation catalyst can be in a finely-divided form, such as powder, separate from the hydrocarbon cracking catalyst, or can be supported on another substrate and admixed with the cracking catalyst. The support for the oxidation catalyst can be less catalytically active, or even inert, to the oxidation and hydrocarbon conversion reactions. Desirably, the support is porous. The support can have a surface area, including the area of the pores on the surface, of at least about 10, preferably at least about 50, square meters per gram. Illustrative of the supports, which may be essentially amorphous, are silica, alumina, silicaalumina, and the like. Solid, platinum group metal or rhenium oxidation catalysts may be used as can other oxidation catalysts that promote the oxidation of carbon monoxide in the presence of molecular oxygen. These oxidation catalysts contain a catalytic metal which promotes the oxidation. The metal may be in combined form, such as an oxide, rather than being in the elemental state. The oxidation catalysts can be rhenium or a platinum group metal of Group 8, such as platinum, palladium and rhodium. The solid oxidation catalyst may comprise two or more catalytically-active metals either physically or chemically combined. By a chemical combination of metals, there are included bi- or poly-metallic salts or oxides. Illustrative of combinations of catalytically-active metals which may promote oxidation of carbon monoxide without unduly adversely affecting the hydrocarbon cracking operations are combinations of the platinum group metals, e.g., platinum, rhenium, the oxides of iron and rhenium, and the like. Other metals can be used.

The substrate for the solid oxidation-promoting carbon monoxide-burning catalyst may be a portion of the cracking catalyst or may be different therefrom, for example, it may be a non-catalytic, porous, solid substrate. When the hydrocarbon cracking catalyst serves as the substrate, care should be taken in selection of the deposition process such that the cracking activity and selectivity of the catalyst is not adversely affected. It is preferred that if the hydrocarbon cracking catalyst is of the type having ion-exchanged sites, the ion-exchange be completed prior to deposition of the oxidation catalyst. The amount of oxidation-promoting metal employed for promotion of the oxidation of carbon monoxide may be in a minor amount effective to enhance the desired oxidation. This amount may be very small, e.g., as little as about 0.01 part per million or less based on the weight of the hydrocarbon cracking catalyst employed. The amount of oxidation-promoting metal may often be at least about 0.1 ppm up to about 5 or about 10 ppm. Larger amounts of the oxidation-promoting metal, such as about 0.01 to 5, or about 0.05 to 1, percent by weight based on the hydrocarbon cracking catalyst, may be employed.

In order to remove sulfur oxides and particulates from the regenerator/combustion off-gases (flue gases), the sulfur oxide and particulate-laden gases are passed through a granular bed filter and scrubber 80 (FIG. 1), either directly or indirectly, after passing through one or more cyclones to remove some of the large gross particulates. The granular bed filter and scrubber is an elongated, upright single, sulfur oxide-capturing and particulate-removing vessel which filters particulates and scrubs sulfur oxides from the influent flue gases. The granular bed filter and scrubber has an exterior vertical sidewall 82 with a circular cross-section, an elongated frustro-conical bottom section or portion 84 whose flared sidewalls converge downwardly and terminate into an outlet or discharge mouth 86 along the vertical axis of the granular bed filter and scrubber, and an upwardly converging roof or top 88.

The granular bed filter and scrubber has a vertical conduit or pipe 90 which provides a gas inlet line. The conduit extends vertically downwardly through the roof along the vertical axis of the filter and scrubber to a discharge position in the upper portion of the interior of the frustro-conical bottom section. The vertical conduit has an enlarged head 92 at its upstream end which extends upwardly through the roof, an elongated main body 94 which has a smaller cross-section than the head and is circumferentially surrounded by the sidewall 82, and has an outwardly flared discharge portion 96 at its downstream end with downwardly converging frustro-conical walls which terminate in a gas outlet and discharge mouth 98. The upstream head of the conduit preferably has a vertical inlet mouth 100, although in some circumstances it may be desirable to have a horizontal inlet mouth.

Extending downwardly from the roof within the interior of the filter and scrubber is an annular frustro-conical, adsorber collection reservoir or ball hopper 102 whose flared sidewalls converge downwardly and surround the upper portion of the vertical conduit. Discharge chutes or outlet pipes 104 and 106 extend generally downwardly from the reservoir into or slightly above a downwardly-moving bed 108 of sulfur oxide-capturing and particulate-removing material. The chutes can include a centrally-disposed vertical discharge chute 104 that circumferentially and concentrically surrounds a portion of the main body section 94 of the vertical conduit and symmetrical, outwardly inclined, angular chutes 106 which extend downwardly and outwardly at an angle of inclination relative to the vertical axis of the filter and scrubber. Extending outwardly from the sides of the filter and scrubber is a gas outlet line 110. A regenerated adsorber-inlet line 114 extends generally downwardly at an angle of inclination through the roof of the scrubber and filter.

In the preferred embodiment, the bottom frustro-conical section 84 of the granular bed filter and scrubber is filled with a downwardly moving bed 108 of sulfur oxide-capturing and particulate-removing granular material which is in the form of balls, pebbles, spheres, or pellets. The sulfur oxide-capturing and particulate-removing material provides adsorbers or acceptors which adsorb, collect, and/or otherwise remove sulfur oxides and particulates from the influent gaseous stream (regenerator flue gases). In the most preferred embodiment, the bed of granular material is a bed of sulfur oxide and nitrogen oxide-capturing and particulate-removing material, which serve as sulfur dioxide, nitrogen oxide, and particulate adsorbers or acceptors. The adsorbers enter the granular bed filter and scrubber through fresh make-up adsorber line 112 or regenerated adsorber line 114 and descend by gravity into the frustro-conical adsorber reservoir 102. The adsorbers are discharged downwardly from the reservoir through the downwardly extending chutes into the downwardly moving bed.

The adsorbers preferably comprise substantially alumina, and most preferably alumina compounded with magnesia, for best results. Gamma ($\gamma$) alumina, chi-eta-rho ($\chi$, $\eta$, $\rho$)alumina, delta ($\delta$) alumina, and theta ($\theta$) alumina are particularly useful as adsorbers and supports because of their high surface areas. While alpha ($\alpha$) alumina and beta ($\beta$) alumina can be used as adsorbers, they are not as effective as gamma, chi-eta-rho, delta, and theta alumina. The oxides of other metals can also be used as adsorbers, either alone or in combination with alumina, or as spinels, such as bismuth, manganese, yttrium, antimony, Group 1a metals, Group 2a metals, rare earth metals, and combinations thereof. Magnesium aluminate spinels are particularly useful as adsorbers. Lanthanum and cerium are preferred rare earth metals. Naturally occurring rare earths, such as in the form of baestanite, are also useful adsorbers. The adsorbers can also be a blend/mixture of high density and low density materials, such as of the above-identifield metal oxides.

The adsorbers can be impregnated or otherwise coated with a catalyst or promoter that promotes the removal of sulfur oxides. The preferred catalyst is ceria (cerium oxide) and most preferably platinum for best results. Other catalytic metals, both free and in a combined form, can be used, either alone or in combination with each other and/or in combination with ceria and/or alumina, such as rare earth metals, Group 8 metals, chromium, vanadium, rhenium, and combinations thereof. The promoter can comprise the same material as the adsorber. An even uniform distribution of the promoter is preferred for best results and to minimize adsorber erosion.

The Group 1a metals, Group 2a metals, and Group 8 metals referred to are those listed in the Periodic Table of the Elements in the *Handbook of Chemistry and Physics* (54th Edition). Useful Group 1a metals include: lithium, sodium, potassium, rubidium, and cesium. Useful Group 2a metals include magnesium, calcium, strontium, and barium. Useful Group 8 metals are the Group 8 noble metals (the palladium family of metals) including ruthenium, rhodium, palladium, osmium, iridium, and platinum. The rare earth metals are also referred to as lanthanides. Useful rare earth metals include cerium, praseodymium, neodymium, promethium, samarium, europium, gadolinium, terbium, dysprosium, holmium, erbium, thulium, ytterbium, and lutetium.

In operation, the regenerator off-gases (flue gases) in gas line 12 pass into vertical conduit 90 and flow vertically downwardly along and about the vertical axis of the granular bed filter and scrubber until being discharged from the mouth 98 of the conduit into the bed of sulfur oxide-capturing and particulate-removing material (adsorbers). Depending on the velocity and pressure of the flue gases, the gaseous stream (flue gases) will pass downwardly through a portion of the bed before circulating upwardly. The adsorbers serve to scrub, filter, adsorb, or otherwise remove the particulates and sulfur oxides (SOx) from the flue gases. The cleansed, purified flue gases are withdrawn from the granular bed filter and scrubber through the inlet mouth of the gas outlet line 110, located above the bed, where the purified gases can be safely vented to the atmosphere or conveyed, expanded, fed, and used to drive and propel the turbine blades of a power recovery turbine 116 or other equipment. The turbine can be connected to drive the air blower or pump 32.

In use, the granular bed filter has a highly concentrated collection zone at the exit (mouth) of the vertical conduit where downwardly flowing flue gas enters the bed of adsorbers, along with a downstream counterflow collection region which substantially assures that cleansed (purified) flue gas always exits upwardly through the downwardly moving bed of adsorbers.

The amount of sulfur dioxide ($SO_2$) adsorbed on a platinum catalyst/promoter, such as a 2 ppm platinum catalyst on an alumina adsorber, depends on the amount of catalyst used (space velocity) as well as the temperature at which the adsorption is done. The amount of sulfur dioxide adsorbed, measured as breakthrough time, is greatest at either low temperatures of about 500° F. or high temperatures of about 1,200° F. to about 1,400° F. Sulfur dioxide adsorption will occur at intermediate temperatures ranging from 800° F. to 1,100° F. at an acceptable, but lesser, efficiency. Some sulfur dioxide adsorption may occur at a temperature as low as 200° F. and as high as 1,600° F. in the granular bed filter and scrubber.

The spent adsorbers containing or coated with the removed particulates and sulfur oxides and/or sulfates are discharged through spent adsorber outlet 86 and conveyed by gravity flow through spent adsorber line 118 to the bottom of a spent adsorber regenerator comprising a lift pipe riser 120 or transfer line. The spent absorbers can be continuously discharged from the bottom of the granular bed filter and scrubber and conveyed to the regenerator lift pipe where they are regenerated, scrubbed, and/or cleansed before being recycled back to the granular bed filter and scrubber. To this end, a reducing gas (reduction gas) such as hydrogen, ammonia, carbon monoxide, or light hydrocarbon gases, such as methane, is injected upwardly into the lift pipe riser by gas injector 122. The reducing gas can also be diluted with steam to attain a shift reaction or steam reforming in order to produce hydrogen and carbon monoxide. The steam can be injected into the lift pipe riser (1) along and as part of the reducing gas or (2) through a separate steam injector 123. The reducing gas is injected upwardly at a sufficient velocity and pressure to propel, carry, transport, and convey the adsorbers upwardly through the lift pipe riser into an overhead collection vessel 124. In the lift pipe riser, the reducing gas reacts with the spent adsorbers and simultaneously removes the particulates and sulfur oxides (SOx) while converting the sulfur oxides to hydrogen sulfide ($H_2S$). Hydrogen produced by a steam shift reaction or steam reforming serves as an effective and relatively inexpensive reducing gas to convert sulfur oxides to hydrogen sulfides. The regenerated, cleansed adsorbers are recycled and conveyed from the overhead by gravity through regenerated adsorber line 114 into the granular bed filter and scrubber. Excess regenerated adsorbers can be removed from the system through overflow line 126 and discarded or stored in a hopper.

Methane can be an even more economical reductant or reducing gas under certain conditions than hydrogen. When using methane in the lift pipe riser, the reduction duration influences the sulfur dioxide ($SO_2$) pick-up capacity (regeneration) of the spent alumina adsorbers. At a reduction temperature of 1,200° F. in the lift pipe riser, relatively short methane contact times of about 5 seconds are more effective towards restoring sulfur dioxide ($SO_2$) pick-up capacity (regeneration) of alumina adsorbers circulated in the granular bed filter and adsorber at a 1,300° F. adsorption temperature than longer methane contact times of from 30 to 45 seconds. When the reduction temperature in the lift pipe riser is increased to at least 1,300° F., the effect of methane contact time duration is negligible.

Desirably, the reducing gas also strips, scrubs, or otherwise removes the captured nitrogen oxides (NOx) from the adsorbers in the lift pipe riser and simultaneously converts the removed nitrogen oxides (NOx) to water or steam and molecular nitrogen ($N_2$) which can be safely vented to the atmosphere from the overhead collection vessel through the outlet gas line.

The effluent spent reducing gas, which contains hydrogen sulfide and the removed particulates, is withdrawn from the overhead vessel 124 through gas outlet line 128 where it is passed through one or more cyclones 130 in order to remove most of the particulates via particulate discharge line 132. The filtered gases exit the cyclone through gas line 134 where they can be fed to a bag house 136 to remove most of the remaining particulates through particulate line 138. The filtered gases exit the bag house through gas line 140 where they are passed to an amine recovery unit 142 to concentrate the hydrogen sulfide. Hydrogen sulfide from the vapor recovery and upgrading unit (not shown) downstream of the catalytic cracker, can also be fed to the amine recovery unit. The concentrated hydrogen sulfide is passed from the amine recovery unit through concentrated hydrogen sulfide line 144 to a sulfur recovery unit 146, such as a Claus plant, to recover elemental sulfur through sulfur recovery line 148. The recovered sulfur can be safely stacked in piles or transported elsewhere for other uses. If the level of hydrogen sulfide ($H_2S$) in the filtered spent reducing gas in line 140 is sufficiently concentrated, the filtered gases can be sent directly to the sulfur recovery unit 146 via bypass line 150, bypassing the amine recovery unit.

In the preferred embodiment, in order to effectively and efficiently remove the particulates and sulfur oxides (SOx) from the regenerator/combustion off-gases (flue gases), the off-gases should enter the granular bed filter and scrubber at a temperature ranging from 200° F. to 1,800° F. and most preferably from 500° F. to 1,400° F., at a pressure from atmospheric pressure to 500 psia. For best results, the granular bed filter and scrubber should be operated at a temperature ranging from 200° F. to 1,600° F., preferably from 1,000° F. to 1,400° F., and most preferably from about 1,300° F. to about 1,350° F. at a pressure from 14 psia to 300 psia and preferably from atmospheric pressure to 150 psia. The maximum design operating temperature of the granular bed filter is 2,000° F. The granular bed filter and scrubber has an efficiency ranging from 85% to 100% and preferably greater than 95%.

The solids flux flow rate of the adsorbers fed into the granular bed filter and scrubber is from 10 to 2,000 lbs/ft² hr, and preferably between 20 and 200 lbs/ft² hr for best results. The regenerated and fresh adsorbers are fed into the granular bed filter at a temperature ranging from 200° F. to 1,800° F. and preferably from 500° F. to 1,400° F., at a pressure ranging from 15 to 300 psia and preferably from atmospheric pressure to 150 psia. The adsorbers range in diameter (size) from 1 mm to 13 mm and preferably from 2 mm to 5 mm for best results. Adsorbers ranging in size from 2 to 5 mm are not only effective in removing particulates but provide excess capacity to adsorb sulfur oxides (SOx) and therefore provide a comfortable margin of safety to minimize downtime resulting from attrition or replacement of adsorbers. Only a small fraction of alumina adsorbers, typically less than 1% by weight, is utilized for sulfur dioxide ($SO_2$) capture. The low utilization of the alumina adsorbers avoids the problem of alumina integrity. Integrity problems arise when about 30% or more of the alumina adsorbers are used for sulfur dioxide ($SO_2$) capture in large amounts of steam.

The feed ratio (space velocity) of the sulfur oxide-removing catalyst/promoter per lbs/min sulfur dioxide ($SO_2$) in the regenerator off-gases (flue gases) per lb of adsorber is from $1 \times 10^{-3}$ to about $1 \times 10^{-5}$ and most preferably from about $2 \times 10^{-4}$ to about $4 \times 10^{-5}$ for best results. The ratio of catalyst/promoter to adsorbers by weight is in the range of $1 \times 10^{-6}$:1 to about 1:3 and most preferably from about $2 \times 10^{-6}$:1 to about 1:9 for enhanced results.

The adsorbers can have a crush strength ranging from 1 to 10 lbs/mm and preferably between 2 and 8 lbs/mm. The attrition weight of the regenerated adsorbers being recycled through the granular bed filter can range from 0.1% to 2% and is preferably less than 1% per day for less downtime. The surface area-to-weight ratio of the adsorbers can range from 5 to 400 m²/g unsteamed, and 2 to 250 m²/g if steamed during pretreatment. The pore volume of the adsorbers can range from 0.3 to 1.5 m²/g unsteamed, and preferably from 0.25 to 1 m²/g if steamed during pretreatment. The pore radius of the adsorbers can range from 30 to 90 Å unsteamed, and preferably from 50 to 200 Å if steamed during pretreatment.

The bulk density of the moving bed of adsorbers can range from 20 to 120 lbs/ft³ and preferably about 40 lbs/ft³. The bed of adsorbers moves downwardly on the order of 1 to 30 in/hr and preferably from about 2 to 20 in/hr. The flue gas residence time in the bed of adsorbers can range from 1 to 10 seconds and preferably is about 2 seconds with a superficial flue gas velocity through the bed ranging from 0.5 to 5 ft/sec and preferably from about 1 to 2 ft/sec.

The solids residence time of the particulates as well as the adsorbers in the granular bed filter and scrubber is from 1 to 10 hours and preferably from 2 to 4 hours for greater efficiency. The gas residence time of the flue gases in the granular bed filter and adsorber is from 1 to 5 seconds and preferably from 2 to 4 seconds for greater effectiveness.

The lift pipe riser/adsorber-regenerator is preferably operated at a temperature of 1,000° F. to 1,600° F. and preferably from 1,200° F. to 1,400° F., at a total pressure ranging from 15 to 300 psia and preferably from atmospheric pressure to 150 psia, at a hydrogen partial pressure ranging from 0.1p to 1p and preferably from at least 0.5p for best results. The solids residence time of the particulates as well as the adsorbers in the lift pipe riser can be from 15 seconds to 10 minutes, preferably from 60 seconds to 150 seconds and the gas residence time in the lift pipe riser can be from 10 to 30 seconds, preferably from 16 to 18 seconds for best results. The spent adsorbers are heated in the lift pipe riser to a temperature ranging from 800° F. to 1,600° F. and preferably from 1,200° F. to 1,400° F. for best results. The lift gas velocity in the lift pipe riser can range from 5 to 100 ft/sec and preferably from about 20 to 40 ft/sec for best results.

The conversion level of removing particulates from the flue gas stream in the granular bed filter and scrubber is from 85% to 100% and preferably at least 95% for best results. The conversion level of removing sulfur oxides (SOx) from flue gases in the granular bed filter and scrubber is from 85% to 100% and preferably at least 95% for best results. The conversion level of removing nitrogen oxides (NOx) from flue gases in the granular bed filter and scrubber is from 85% to 100% and preferably at least 95% for best results.

The conversion level of removing particulates from the spent adsorbers in the lift pipe riser is from 90% to 100% and preferably from 95% to 98% for better efficiency. The conversion level of converting sulfur oxides and/or sulfates to hydrogen ($H_2S$) sulfide in the lift pipe riser is from 80% to 100% and preferably greater than 99% for greater efficiency.

While the above operating conditions are preferred for best results, in some circumstances it may be desirable to use other operating conditions. Furthermore, while the described granular bed filter and scrubber is preferred to most effectively remove particulates, sulfur oxides, and nitrogen oxides from flue gases, in some circumstances it may be desirable to use other types of vessels, devices, or apparatus to simultaneously remove particulates, sulfur oxides, and nitrogen oxides from flue gases, such as those shown in U.S. Pat. Nos. 4,017,278; 4,126,435; and 4,421,038, which are hereby incorporated by reference in their entirety.

The sulfur oxide-capturing catalyst/promoter can be impregnated, deposited, or sprayed onto the adsorbers or fed separately with the adsorbers into the granular bed filter and scrubber.

EXAMPLE 1

A sulfur dioxide ($SO_2$) adsorption capacity test was conducted with flue gas having an inlet composition of 1,000 ppmv sulfur dioxide, 3% by volume molecular oxygen ($O_2$), and 2% by volume water vapor with a gas flow rate of about 10 cc/min at a temperature of 1,200° F. Alumina adsorbers were used having a crush strength of 7.47 lbs/mm, an attrition rate of 0.06%, an unsteamed surface area of 198 m$^2$/g, a pore volume of 0.3609 cc/g unsteamed, and a pore radius of 32 Å unsteamed. The alumina adsorbers removed 204 $\mu$l of sulfur dioxide ($SO_2$) per 50 mg of adsorbers.

EXAMPLE 2

A sulfur dioxide adsorption capacity test was conducted under the same conditions as in Example 1, except that the alumina adsorbers had a crush strength of 1.75 lbs/mm, an attrition rate of 0.01%, a surface area of 269 m$^2$/g unsteamed, a pore volume of 0.8426 cc/g unsteamed, and a pore radius of 38 Å unsteamed. The adsorbers removed 241 $\mu$l of sulfur dioxide ($SO_2$) per 50 mg of adsorbers.

EXAMPLE 3

A sulfur dioxide adsorption capacity test was conducted under the conditions of Example 1, except that the alumina adsorbers were impregnated with 2 ppm platinum catalyst/promoter to promote the adsorption of SOx. The platinum-promoted alumina adsorbed 270 $\mu$l sulfur dioxide ($SO_2$) per 50 mg of adsorbers.

EXAMPLE 4

A sulfur dioxide adsorption capacity test was conducted under the conditions of Example 2, except that the alumina adsorbers were impregnated with 2 ppm platinum. The platinum-promoted alumina adsorbers removed 393 $\mu$l of sulfur dioxide ($SO_2$) per 50 mg of adsorbers.

EXAMPLE 5

A sulfur dioxide adsorption capacity test was conducted under the conditions of Example 1, except that the alumina adsorbers were impregnated with 6 ppm platinum. The platinum-promoted alumina adsorbers removed 324 $\mu$l sulfur dioxide ($SO_2$) per 50 mg of adsorbers.

EXAMPLE 6

A sulfur dioxide adsorption capacity test was conducted under the conditions of Example 2, except that the alumina adsorbers were impregnated with 6 ppm platinum. The platinum-promoted alumina adsorbers removed 414 $\mu$l of sulfur dioxide ($SO_2$) per 50 mg of adsorbers.

EXAMPLE 7

A regeneration test was conducted to regenerate the spent platinum-promoted alumina adsorbers of Example 4, while simultaneously removing the captured sulfur oxide (SOx) and/or sulfate from the adsorbers. The spent adsorbers were exposed to a pure dry hydrogen stream flowing at 10 cc/min for about 30 seconds at a temperature of 1,200° F. The promoter was then subjected to an air purge to oxidize the platinum sulfide to platinum. The regenerated adsorbers were then used to adsorb the sulfur dioxide ($SO_2$) in the flue gas of Example 4 and achieved virtually a 100% sulfur dioxide ($SO_2$) removal rate in less than 10 seconds.

EXAMPLE 8

A sulfur dioxide adsorption test was conducted on the flue gas of Example 1 but at a temperature of 1,382° F. and using adsorbers comprising 100 mole percent magnesium (MgO) impregnated with 6% by wt ceria ($CeO_2$). After 92 min., 26,300 $\mu$l of sulfur dioxide ($SO_2$) per 50 mg of adsorbers were adsorbed. The adsorbers had an activity of 0.748 relative to the alumina adsorbers impregnated with ceria.

EXAMPLE 9

A sulfur dioxide adsorption test was conducted under the conditions of Example 8, except that the ceria-impregnated adsorbers contained 92.6 mole percent magnesium and 7.4 mole percent alumina. The adsorbers removed 16,700 $\mu$l of sulfur dioxide ($SO_2$) per 50 mg of adsorbers and had a relative activity of 0.475.

EXAMPLE 10

A sulfur dioxide adsorption test was conducted under the conditions of Example 8, except that the ceria-impregnated adsorbers contained 18.5 mole percent magnesia and 8.5 mole percent alumina. The adsorbers removed 10,550 $\mu$l of sulfur dioxide ($SO_2$) per 50 mg of adsorbers and had a relative activity of 0.3.

EXAMPLE 11

A sulfur dioxide adsorption test was conducted under the conditions of Example 8, except that the ceria-impregnated adsorbers contained 55.8 mole percent magnesia and 44.2 mole percent alumina. The adsorbers removed 4,100 μl of sulfur dioxide ($SO_2$) per 50 mg of adsorbers and had a relative activity of 0.0117.

EXAMPLE 12

A sulfur dioxide adsorption test was conducted under the conditions of Example 8, except that the ceria-impregnated adsorbers contained 33.5 mole percent magnesia and 66.5 mole percent alumina. The adsorbers removed 1,700 μl of sulfur dioxide ($SO_2$) per 50 mg of adsorbers and had a relative activity of 0.048.

EXAMPLE 13

A sulfur dioxide adsorption test was conducted under the conditions of Example 8, except that alumina adsorbers impregnated with 6% by weight ceria were used. The adsorbers removed 650 μl of sulfur dioxide ($SO_2$) per 50 mg of adsorbers and had a relative activity of 0.018. The liquid hourly space velocity was 9,600 SCFH.

EXAMPLE 14

An attrition rate test was conducted with the adsorbers in Example 13. The adsorbers were found to have an attrition rate of 20.5%.

EXAMPLE 15

An attrition rate test was conducted with adsorbers comprising 16.7 mole percent magnesia and 83.3 mole percent alumina impreganted with 6 weight percent ceria. The adsorbers were found to have an attrition rate of 15.8%.

EXAMPLE 16

An attrition rate test was conducted with adsorbers comprising 15 mole percent magnesia and 50 mole percent alumina impregnated with 6 weight percent ceria. The attrition rate was found to be 9.7%.

EXAMPLE 17

An attrition rate test was conducted with adsorbers containing 83.3 mole percent magnesia and 16.7 mole percent alumina. The attrition rate was found to be 7.0%.

In the process of FIG. 1, the sulfur oxides (SOx) and particulates are at least partially removed by chemical adsorption, sometimes referred to as oxidative adsorption, with the captured SOx being converted to hydrogen sulfide ($H_2S$) when reacted with a reducing gas in the regenerator/lift pipe riser.

Captured sulfur dioxide ($SO_2$) reacts with alumina adsorbers to form alumina sulfate on the alumina adsorbers in accordance with the following formula:

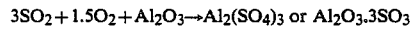

$$3SO_2 + 1.5O_2 + Al_2O_3 \rightarrow Al_2(SO_4)_3 \text{ or } Al_2O_3 \cdot 3SO_3$$

The efficiency of chemical adsorption (oxidative adsorption) in removing sulfur dioxide ($SO_2$) from the flue gases in the granular bed filter and scrubber is enhanced if the operating temperature of the granular bed filter and scrubber is in the range of 1,200° F. to 1,400° F.

The spent adsorbers containing the alumina sulfate are regenerated in the lift pipe riser by reacting the spent adsorbers with a reducing gas, such as hydrogen, ammonia, carbon monoxide, or light hydrocarbon gases, such as methane, to remove and convert the alumina sulfate to hydrogen sulfide ($H_2S$). The regeneration of the adsorbers and the removal of the captured sulfur dioxide in the lift pipe riser is sometimes referred to as desorption.

Figure 2:
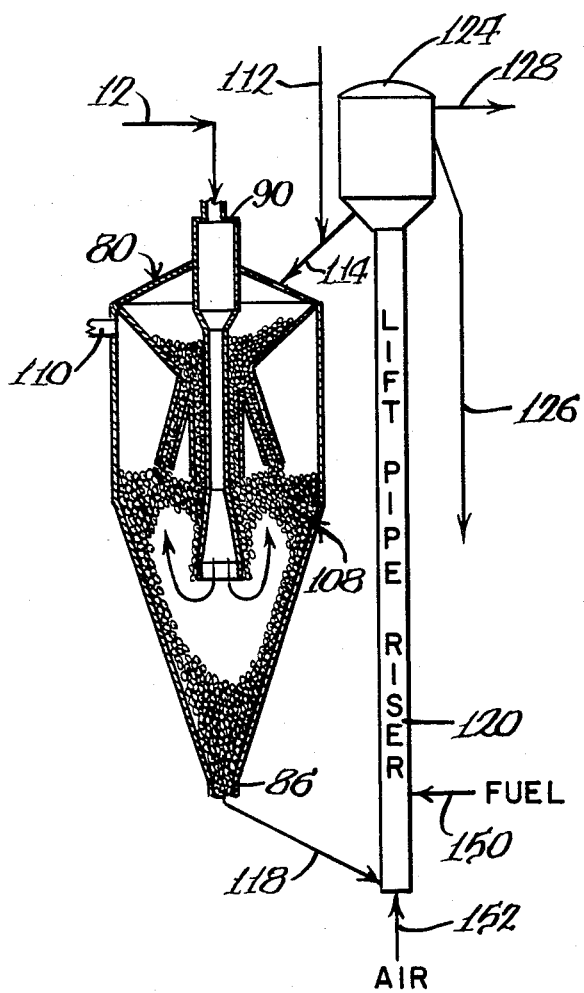
FIG. 2 is a schematic flow diagram of part of the gas purification process with air, instead of a reduction gas, being injected into the lift pipe riser.

The process of FIG. 2 is similar to the process of FIG. 1, except that the adsorbers remove the sulfur oxides (SOx) and particulates from the flue gas streams in the granular bed filter and scrubber primarily by physical adsorption, sometimes referred to as non-oxidative adsorption, and the spent adsorbers are thermally regenerated in the lift pipe riser 120 by heat, preferably by combustion with an oxygen-containing combustion-sustaining gas, such as air, instead of a reducing gas, to remove the captured sulfur oxides (SOx) and particulates from the spent adsorbers. The additional heat which is required for thermal regeneration can be supplied by combusting a fuel while in contact with the spent adsorbers. The fuel can be injected into the lower portion of the lift pipe riser through an auxiliary or supplemental fuel line 150. The fuel can be torch oil, hydrogen sulfide, or light hydrocarbon gases, such as methane. Other fuels can be used. Air is injected upwardly into the lift pipe riser through air injector line 152 at a sufficient pressure and velocity to convey, propel, carry, and transport the adsorbers along with the particulates and sulfur oxides to the overhead collection vessel 124. During thermal regeneration, the particulates are removed (freed) from the adsorbers, the captured sulfur oxides are removed and become more concentrated, and/or the sulfates are removed from the adsorbers and converted to sulfur dioxide ($SO_2$). The effluent gases containing the concentrated levels of sulfur dioxide ($SO_2$), and sometimes hydrogen sulfide ($H_2S$) from the combusted auxiliary fuel in the overhead collection vessel are withdrawn from the vessel by gas line 128 and fed to a sulfur recovery unit, such as a Claus plant to recover elemental sulfur.

Adsorption efficiency, as measured by breakthrough times, for removing sulfur dioxide ($SO_2$) by physical adsorption (non-oxidative adsorption) is enhanced if the granular bed filter and scrubber is operated at a temperature ranging from 500° F. to 800° F. The adsorption process for physically adsorbing sulfur dioxide on alumina adsorbers can be characterized by the following formula:

$$SO_2 + Al_2O_3 \rightarrow Al(SO_3)_3 \text{ or } SO_2 \cdot Al_2O_3$$

The hydrogen sulfide ($H_2S$) in the waste gases in the effluent line 128 (FIG. 1) of the overhead collection vessel 124 can be removed and concentrated by various methods, such as in an amine recovery unit 142 with either diethanolamine (DEA) or monoethanolamine (MEA), the iron sponge process, or the hot potassium carbonate process. A DEA-operating amine unit is preferred because it is more efficient and has less chemical degradation and lower make-up risk than the other processes.

The amine recovery unit preferably decreases the concentration of hydrogen sulfide in the waste gas stream to less than 1 part per cubic foot of gas. DEA is preferred over MEA because of degradation of MEA by carbonyl sulfide and carbon disulfide in the gases. DEA amine solutions will absorb both hydrogen sulfide (H₂S) and carbon dioxide (CO$_2$) according to the following reaction:

$$RNH_2 + H_2S \rightleftarrows RNH_3HS$$
$$CO_2 + RNH_2 + H_2O \rightleftarrows RNH_3HCO_3$$

Absorption of hydrogen sulfide occurs in the amine recovery unit at 100° F. or below and rejection of sulfide is active at 240° F. The amine desulfurization process which occurs in the amine recovery unit involves contacting the sour sulfur-containing gas stream (waste gases) with a cool DEA amine solution to absorb the hydrogen sulfide and then regenerate the amine and strip the hydrogen sulfide from the amine solution by heating.

Figure 3:
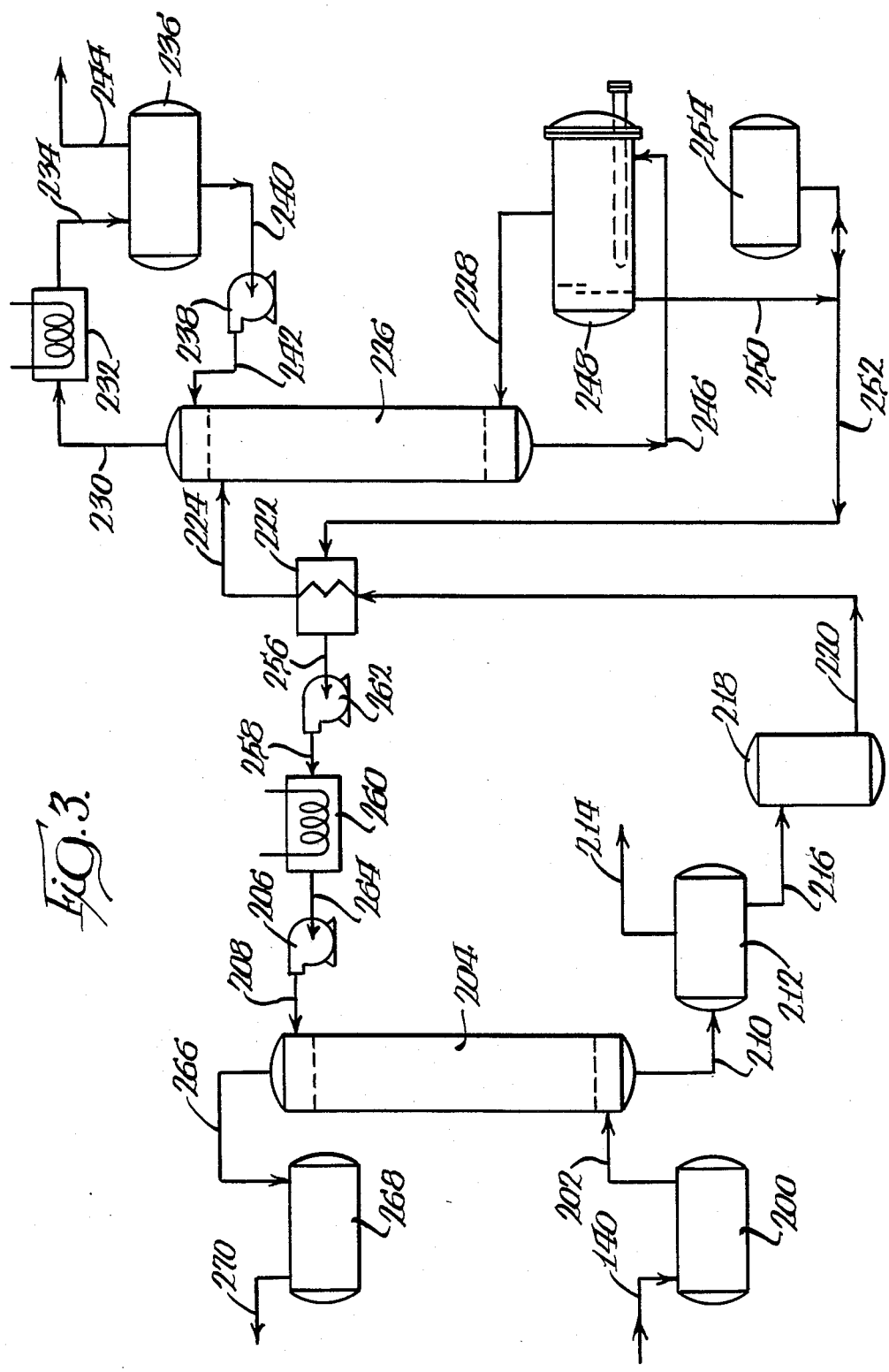
FIG. 3 is a schematic flow diagram of an amine recovery unit.

In the preferred embodiment, the amine recovery unit takes the form shown in FIG. 3, although other types of amine recovery units can be used, if desired. In the embodiment of FIG. 3, sour waste gases (acid gases) in waste gas line 140 are fed to an inlet scrubber 200 which removes (scrubs) entrained liquids, including distillate and water, from the waste gases. The scrubbed gases are discharged from the inlet scrubber through scrubber discharge line 202 and fed to the bottom portion of a contactor or absorber column 204. A DEA amine feed is pumped into the top portion of the absorber column by amine charge pump 206 via amine feed line 208. In the adsorber column, the scrubbed waste gases are contacted in countercurrent flow relationship with the amine feed to react the hydrogen sulfide and the carbon dioxide in the waste gases with the amine. The adsorber column can be a trayed or packed tower and provides gas-liquid adsorption.

Rich amine is discharged from the bottom of the adsorber column through rich amine line 210 and fed to a flash tank 212 where it is flashed at a reduced pressure to remove entrained gases through entrained gas line 214. The flashed rich amine gases are discharged from the bottom of the flash tank through discharge line 216 and fed to and filtered in a carbon filter 218. The filtered rich amine is fed through filtered amine line 220 to a rich/lean amine heat exchanger 222 where the rich amine is heated. The heated rich amine is discharged from the heat exchanger through heated rich amine line 224 and fed to the upper portion of a stripper column, steam stripper, or still 226.

Steam is injected into the lower portion of the steam stripper 226 through steam injection line 228. In the steam stripper, the rich amine solution is regenerated and stripped of acid gases by the steam. The concentrated acid gases are withdrawn from the steam stripper through overhead acid gas line 230 and cooled in a water cooler or condenser 232. The cooled acid gases are passed through cooled acid gas line 234 and collected in a reflux accumulator 236. Part of the concentrated acid gases in the reflux accumulator can be recycled, refluxed, and pumped into the upper portion of the steam stripper (stripper column) 226 by reflux pump 238 via reflux lines 240 and 242. The excess acid gases can be discharged from the reflux accumulator through excess gas line 244 and flared or sent to a sulfur recovery unit, such as a Claus plant.

The stripped rich amine is discharged from the bottom of the steam stripper 226 through stripped amine line 246 and fed to a reboiler 248. Steam is boiled out of the amine in the reboiler and withdrawn through overhead steam line 228 where it is injected into the lower portion of the steam stripper 226. The residual boiled lean amine is discharged from the reboiler through lean amine discharge line 250 and passed through lean amine line 252 to heat exchanger 222. The inventory of the lean amine in amine line 252 is controlled by surge tank 254.

Lean amine exits the heat exchanger 222 through outlet line 256 and is pumped through line 258 to a cooler or heat exchanger 260 by booster pump 262. The lean amine solution is cooled in the heat exchanger 260. The cooled amine is discharged from the heat exchanger 260 through cooled amine line 264 and pumped through lean amine feed line 208 into the upper portion of the absorber column 204 by amine charge pump 206.

Effluent gases are withdrawn from the absorber column through overhead gas line 266 and fed to an outlet scrubber 268. The outlet scrubber scrubs the gases from the gas line 266 to recover any residual amine solution carried over in the effluent gases. The sweet scrubber gases are discharged from the outlet scrubber throgh sweet gas line 270.

Figure 4:
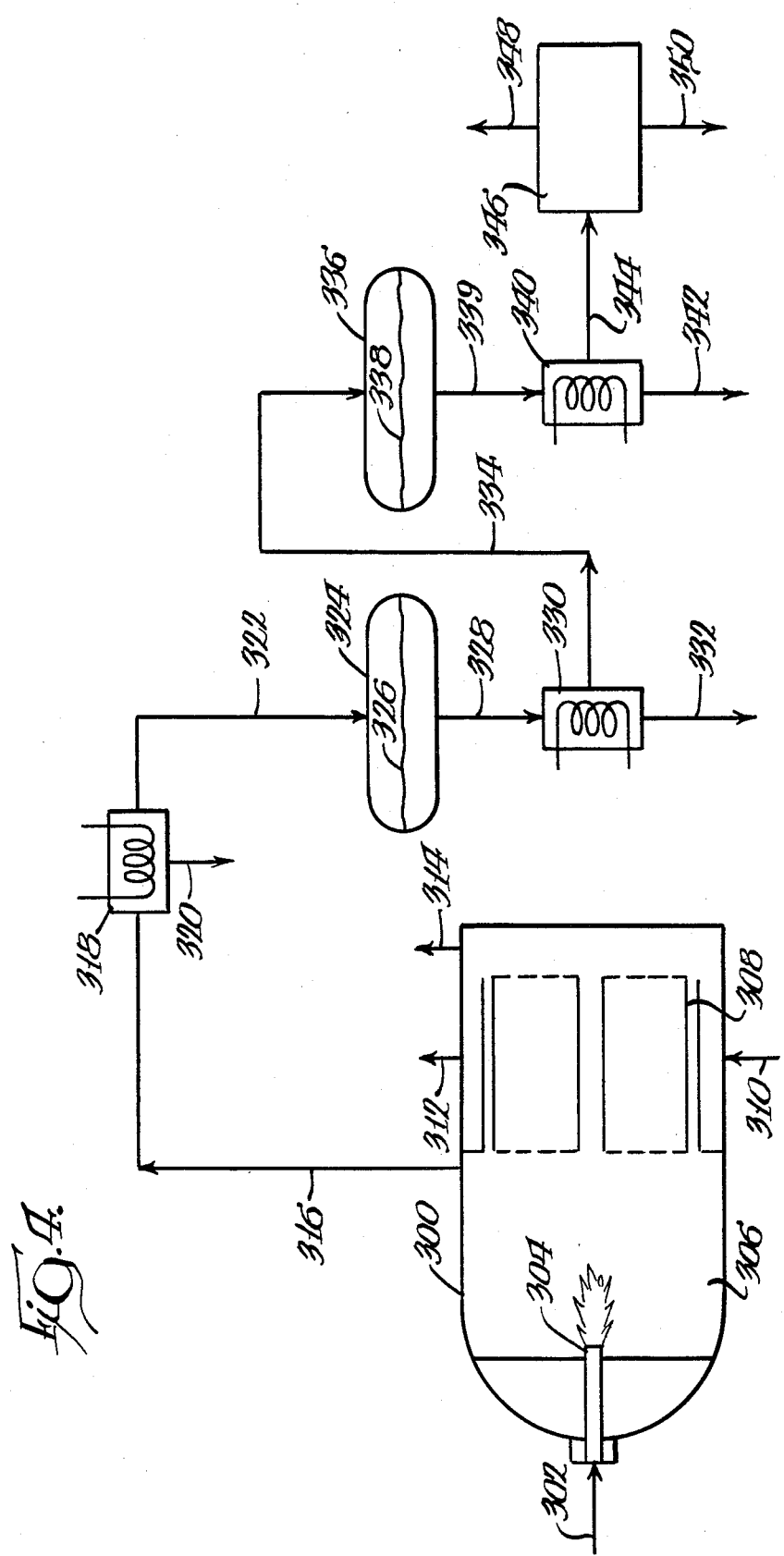
FIG. 4 is a schematic flow diagram of a sulfur recovery unit.

The acid waste gases in lines 140 and 150 (FIG. 1), as well as the acid gases in acid gas line 244 from the reflux accumulator 236, are fed to a sulfur recovery unit and scavenger plant, preferably a Claus plant, such as the type shown in FIG. 4. The Claus plant can recover 99.0% or more of the elemental sulfur in the influent acid gases.

As shown in FIG. 4, acid gases enter an oxidation unit and waste-heat boiler 300 through an acid gas inlet line 302. In the oxidation unit, about one-third of the hydrogen sulfide (H$_2$S) in the acid gases is oxidized to sulfur dioxide (SO$_2$) and water or steam in accordance with the following exothermic reaction:

$$H_2S + 3/2 O_2 \rightarrow SO_2 + H_2O$$

The reaction furnace section 306 of the unit 300 is downstream of the burner and provides a thermal region in which about 70% by weight of the hydrogen sulfide (H$_2$S) of the remaining acid gases and the sulfur dioxide (SO$_2$) is converted to elemental molecular sulfur and water or steam in accordance with the following endothermic reaction:

$$2H_2S + SO_2 \rightarrow 3/2 S_2 + 2H_2O$$

Water is fed into the boiler section 308 of the unit 300 through water line 310. The hot reaction gases in the reaction furnace, which can be at a temperature such as 2,300° F., are cooled by the water in the water pipes of the boiler section to a much cooler temperature, such as 1,100° F. The water in the water pipes of the boiler section is boiled and heated by the hot reaction gases and converted to steam. Steam is removed from the boiler section through steam line 312. In the boiler section, the elemental sulfur is converted to S$_6$ and S$_8$ in accordance with the following exothermic reactions:

$$S_2 \rightarrow \tfrac{1}{3} S_6$$

and $$S_2 \rightarrow \tfrac{1}{4} S_8$$

Hot gases containing S$_6$ and S$_8$ are withdrawn from the unit through gas bypass line 314.

The partially stripped reaction gases are removed from the unit 300 through outlet gas line 316. The stripped reaction gases typically contain hydrogen sulfide ($H_2S$), sulfur dioxide ($SO_2$), elemental sulfur ($S_2$), nitrogen ($N_2$), carbonyl sulfide (COS), carbon disulfide ($CS_2$), and steam. The stripped reaction gases can be withdrawn from the unit through gas line 316 at a temperature ranging from 550° F. to 600° F. The stripped reaction gases in the gas line 316 are fed to a heat exchanger 318 to cool the reaction gases to about 530° F. and condense or precipitate some of the sulfur. The condensed or precipitated sulfur is removed from the heat exchanger through sulfur line 320.

The cooled reaction gases are withdrawn from the heat exchanger 318 through cooled gas line 322 and fed to a first Claus converter 324. The bottom portion of the converter contains a fixed catalyst bed 326 of sulfur-capturing catalysts. The reaction gases are passed through the fixed catalyst bed in the first converter to catalytically react the remaining hydrogen sulfide ($H_2S$) with the sulfur dioxide ($SO_2$) to form water and free sulfur. The products are heated by the catalytic reaction to over 650° F. The reaction products are discharged from the first converter through discharge line 328 and cooled in a cooler or heat exchanger 330 to condense, precipitate, and/or recover more sulfur. The sulfur is removed from the heat exchanger through sulfur recovery line 332.

The cooled reaction gases, which can be cooled to below 400° F., are withdrawn from the heat exchanger 330 through cooled reaction gas line 334 and fed to a second Claus converter 336. The second Claus converter also has a fixed catalyst bed 338 of elemental sulfur-capturing catalyst. The reaction products are passed through the catalyst bed 338 to catalytically react the remaining hydrogen sulfide ($H_2S$) with the sulfur dioxide ($SO_2$) to form water and free sulfur. The resulting reaction products are heated to a temperature slightly below 500° F. by the reaction in the second converter. The reaction products are discharged from the second converter through reaction product outlet line 330 and cooled in a cooler or heat exchanger 340 to condense, precipitate, and/or remove substantially all of the remaining sulfur.

The sulfur is removed from the heat exchanger 340 through sulfur recovery line 342. The cooled tail gases are withdrawn from the heat exchanger 340 through tail gas outlet line 344 and passed to tail gas clean-up equipment 346, such as Beavon and Stretford processing equipment, to clean up the tail gases. The sweet cleansed tail gases are withdrawn from the tail gas clean-up equipment through sweet gas line 348. Sulfur recovered from the tail gases are removed from the tail gas clean-up equipment through sulfur recovery line 350.

While the above two-stage Claus plant is preferred because it recovers at least 95% elemental sulfur, other types of Claus plants can be used, if desired, such as a split-stream Claus plant, a partial-oxidation Claus plant, an ultra three-stage Claus plant, etc.

Although embodiments of this invention have been shown and described, it is to be understood that various modifications and substitutions, as well as rearrangements and combinations of parts, components, equipment, and/or process steps, can be made by those skilled in the art without departing from the novel spirit and scope of this invention.

What is claimed is:

1. A gas purification process, comprising the steps of:
    withdrawing a particulate-laden gaseous stream comprising particulates and sulfur oxides from a combustor of a processing unit selected from the group consisting of a catalytic cracking unit, a synthetic fuels plant, a coal liquefaction plant, a gasification plant, a power plant, a paper mill, a steel mill, and a waste treatment facility;
    removing large gross particulates from said particulate-laden gaseous stream in at least one cyclone by passing said particulate-laden gaseous stream through at least one cyclone;
    feeding said particulate-laden gaseous stream to a vessel after said particulate-laden gaseous stream has been passed through at least one cyclone, said vessel having a bed of sulfur oxide-capturing and particulate-removing material comprising at least one member selected from the group consisting of adsorbers and adsorbers with at least one promoter thereon, said adsorbers substantially comprising an oxide of at least one metal selected from the group consisting of aluminum, bismuth, manganese, yttrium, antimony, tin, a rare earth metal, a Group 1a metal, and a Group 2a metal, and said promoter selected from the group consisting essentially of a rare earth metal, a Group 8 metal, chromium, vanadium, rhenium, and combinations thereof;
    substantially decreasing the concentration of both particulates and sulfur oxides in said particulate-laden gaseous stream in said vessel; and
    said decreasing comprising simultaneously removing a substantial portion of said particulates and a substantial portion of said sulfur oxides from said particulate-laden gaseous stream by passing said particulate-laden gaseous stream through a portion of said bed of sulfur oxide-capturing and particulate-removing material in said vessel.

2. A gas purification process in accordance with claim 1 wherein said gaseous stream further comprises nitrogen oxides from said combustor and said decreasing includes decreasing the concentration of nitrogen oxide in said gaseous stream by substantially removing a substantial portion of said nitrogen oxides from said particulate-laden gaseous stream in said vessel by passing said gaseous stream through a portion of said bed.

3. A gas purification process in accordance with claim 1 wherein said sulfur oxides and particulates are removed by chemical adsorption in said vessel at a temperature ranging from about 1,200° F. to about 1,400° F. and spent adsorbers containing said removed particulates and sulfur oxides are regenerated with a reducing gas consisting essentially of hydrogen, ammonia, carbon monoxide, light hydrocarbon gases, and combinations thereof.

4. A gas purification process in accordance with claim 1 including cracking oil in a catalytic cracking unit in the presence of a cracking catalyst, regenerating said catalyst in a regenerator of said catalytic cracking unit to emit an effluent stream laden with combusted, spent cracking catalyst particulates and sulfur oxides, said combustor comprising said regenerator and said particulate-laden stream comprising said effluent stream.

5. A gas purification process in accordance with claim 1 including processing synthetic fuel selected from the group consisting essentially of oil shale, tar sands, coal, lignite, peat, diatomite, uintaite, and biomass in a synthetic fuels plant to liberate synthetic oil, said processing including emitting an effluent stream laden with substantially combusted synthetic fuel particulates and sulfur oxides, and said particulate-laden stream comprises said effluent stream.

6. A gas purification process, comprising the steps of:
cracking a hydrocarbon feedstock in a reactor of a catalytic cracking unit in the presence of a cracking catalyst under catalytic cracking conditions to produce an upgraded cracked product leaving spent cracking catalyst;
regenerating said spent cracking catalyst in a regenerator;
emitting regenerator particulate-laden off-gases comprising sulfur oxides and cracking catalyst particulates from said regenerator;
passing said regenerator off-gases generally downwardly through a substantially vertical conduit of a granular bed filter and scrubber, and thereafter, through at least a portion of a downwardly moving bed of sulfur oxide-capturing and particulate-removing material to remove a substantial portion of said cracking catalyst particulates and sulfur oxides from said gases so as to produce substantially purified gases having a substantially lower concentration of sulfur oxides and cracking catalyst particulates than said regenerator off-gases and leaving spent sulfur oxide-capturing and particulate-removing material with said cracking catalyst particulates and sulfur-containing deposits thereon selected from the group consisting essentially of sulfur oxides, sulfates, and combinations thereof;
removing said spent sulfur oxide-capturing and particulate-removing material from said granular bed filter and scrubber and feeding said removed material to a generally upright lift pipe riser having an overhead collection vessel;
regenerating said spent sulfur oxide-capturing and particulate-removing material in said lift pipe riser while simultaneously moving said spent sulfur oxide-capturing and particulate-removing material substantially upwardly in said lift pipe riser to substantially remove said particulates and said sulfur-containing deposits from said material while emitting effluent gases containing said removed particulates and sulfur-containing material selected from the group consisting of hydrogen sulfide, sulfur-containing deposits, and combinations thereof;
feeding said regenerated sulfur oxide-capturing and particulate-removing material directly to said granular bed filter and scrubber from said lift pipe riser for use as part of said downwardly moving bed;
removing a substantial portion of said particulates from said effluent gases in at least one cyclone;
recovering elemental sulfur from said effluent gases from said lift pipe riser in a sulfur recovery unit;
said sulfur oxide-capturing said particulate-removing material being selected from the group consisting essentially of adsorbers and adsorbers with at least one promoter thereon, said absorbers substantially comprising an oxide of at least one metal selected from the group consisting of aluminum, bismuth, manganese, yttrium, antimony, tin, a rare earth metal, a Group 1a metal, and a Group 2a metal, and said promoter being selected from the group consisting essentially of a rare earth metal, a Group 8 metal, chromium, vanadium, rhenium, and combinations thereof; and
at least 90% by weight of said sulfur oxides in said regenerator off-gases are removed by said bed.

7. A gas purification process in accordance with claim 6 wherein said purified gases are withdrawn from said granular bed filter and scrubber and fed to a turbine, said purified gases powering said turbine, said turbine driving a blower, and said blower injecting air into said regenerator to substantially combust said spent cracking catalyst.

8. A gas purification process in accordance with claim 6 wherein said regenerator has a dense phase bed in its lower portion and a dilute phase bed in its upper portion and said regenerating includes substantially complete burning of carbon monoxide in said regenerator.

9. A gas purification process in accordance with claim 6 including removing nitrogen oxides from said regenerator off-gases in said granular bed filter and scrubber.

10. A gas purification process in accordance with claim 6 wherein said regeneration of said spent sulfur oxide-capturing and particulate-removing material in said lift pipe riser comprises thermal regeneration with a supplemental fuel including at least one member selected from the group consisting of torch oil, hydrogen sulfide, and light hydrocarbon gases in said lift pipe riser, and injecting said supplemental fuel into said lift pipe riser.

11. A gas purification process in accordance with claim 6 wherein said sulfur oxides are removed from said regenerator off-gases by chemical adsorption at a temperature ranging from 1,200° F. to 1,400° F. in said granular bed filter and scrubber, and said regeneration of said spent sulfur oxide-capturing and particulate-removing material comprises reacting said spent sulfur oxide-capturing and particulate-removing material with a reducing gas selected from the group consisting essentially of hydrogen, ammonia, carbon monoxide, light hydrocarbon gases, and combinations thereof, in said lift pipe riser.

12. A gas purification process in accordance with claim 11 wherein said reacting includes converting said sulfur-containing deposits in said lift pipe riser to hydrogen sulfide.

13. A gas purification process, comprising the steps of:
cracking a hydrocarbon feedstock in a reactor of a catalytic cracking unit in the presence of a cracking catalyst under catalytic cracking conditions to produce an upgraded cracked product leaving spent cracking catalyst;
regenerating said spent cracking catalyst in a regenerator;
emitting regenerator particulate-laden off-gases comprising sulfur oxides and cracking catalyst particulates from said regenerator;
passing said regenerator off-gases generally downwardly through a substantially vertical conduit of a granular bed filter and scrubber, and thereafter, through at least a portion of a downwardly moving bed of sulfur oxide-capturing and particulate-removing material to remove a substantial portion of said cracking catalyst particulates and sulfur oxides from said gases so as to produce substantially purified gases having a substantially lower concentration of sulfur oxides and cracking catalyst particulates than said regenerator off-gases and leaving spent sulfur oxide-capturing and particulate-removing material with said cracking catalyst particulates and sulfur-containing deposits thereon selected from the group consisting essentially of sulfur oxides, sulfates, and combinations thereof;

removing said spent sulfur oxide-capturing and particulate-removing material from said granular bed filter and scrubber and feeding said removed material to a generally upright lift pipe riser having an overhead collection vessel;

regenerating said spent sulfur oxide-capturing and particulate-removing material in said lift-pipe riser while simultaneously moving said spent sulfur oxide-capturing and particulate-removing material substantially upwardly in said lift pipe riser to substantially remove said particulates and said sulfur-containing deposits from said material while emitting effluent gases containing said removed particulates and sulfur-containing material selected from the group consisting of hydrogen sulfide, sulfur-containing deposits, and combinations thereof;

feeding said regenerated sulfur oxide-capturing and particulate-removing material directly to said granular bed filter and scrubber from said lift pipe riser for use as part of said downwardly moving bed;

removing a substantial portion of said particulates from said effluent gases in at least one cyclone;

recovering elemental sulfur from said effluent gases from said lift pipe riser in a sulfur recovery unit; and said sulfur oxide-capturing and particulate-removing material comprising alumina selected from the group consisting essentially of gamma alumina, chi-eta-rho alumina, delta alumina, and theta alumina.

14. A gas purification process in accordance with claim 13 wherein said alumina contains 2 ppm to 6 ppm by weight promoter selected from the group consisting essentially of platinum, ceria, and combinations thereof.

15. A gas purification process, comprising the steps of:

cracking a hydrocarbon feedstock in a reactor of a catalytic cracking unit in the presence of a cracking catalyst under catalytic cracking conditions to produce an upgraded cracked product leaving spent cracking catalyst;

regenerating said spent cracking catalyst in a regenerator;

emitting regenerator particulate-laden off-gases comprising sulfur oxides and cracking catalyst particulates from said regenerator;

passing said regenerator off-gases generally downwardly through a substantially vertical conduit of a granular bed filter and scrubber, and thereafter, through at least a portion of a downwardly moving bed of sulfur oxide-capturing and particulate-removing material to remove a substantial portion of said cracking catalyst particulates and sulfur oxides from said gases so as to produce substantially purified gases having a substantially lower concentration of sulfur oxides and cracking catalyst particulates than said regenerator off-gases and leaving spent sulfur oxide-capturing and particulate-removing material with said cracking catalyst particulates and sulfur-containing deposits thereon selected from the group consisting essentially of sulfur oxides, sulfates, and combinations thereof;

removing said spent sulfur oxide-capturing and particulate-removing material from said granular bed filter and scrubber and feeding said removed material to a generally upright lift pipe riser having an overhead collection vessel;

regenerating said spent sulfur oxide-capturing and particulate-removing material in said lift pipe riser while simultaneously moving said spent sulfur oxide-capturing and particulate-removing material substantially upwardly in said lift pipe riser to substantially remove said particulates and said sulfur-containing deposits from said material while emitting effluent gases containing said removed particulates and sulfur-containing material selected from the group consisting of hydrogen sulfide, sulfur-containing deposits, and combinations thereof;

feeding said regenerated sulfur oxide-capturing and particulate-removing material directly to said granular bed filter and scrubber from said lift pipe riser for use as part of said downwardly moving bed;

removing a substantial portion of said particulates from said effluent gases in at least one cyclone;

recovering elemental sulfur from said effluent gases from said lift pipe riser in a sulfur recovery unit; and said absorbers comprising magnesium aluminate spinels.

16. A gas purification process, comprising the steps of:

cracking a hydrocarbon feedstock in a reactor of a catalytic cracking unit in the presence of a cracking catalyst under catalytic cracking conditions to produce an upgraded cracked product leaving spent cracking catalyst;

regenerating said spent cracking catalyst in a regenerator;

emitting regenerator particulate-laden off-gases comprising sulfur oxides and cracking catalyst particulates from said regenerator;

passing said regenerator off-gases generally downwardly through a substantially vertical conduit of a granular bed filter and scrubber, and thereafter, through at least a portion of a downwardly moving bed of sulfur oxide-capturing and particulate-removing material to remove a substantial portion of said cracking catalyst particulates and sulfur oxides from said gases so as to produce substantially purified gases having a substantially lower concentration of sulfur oxides and cracking catalyst particulates than said regenerator off-gases and leaving spent sulfur oxide-capturing and particulate-removing material with said cracking catalyst particulates and sulfur-containing deposits thereon selected from the group consisting essentially of sulfur oxides, sulfates, and combinations thereof;

removing said spent sulfur oxide-capturing and particulate-removing material from said granular bed filter and scrubber and feeding said removed material to a generally upright lift pipe riser having an overhead collection vessel;

regenerating said spent sulfur oxide-capturing and particulate-removing material in said lift pipe riser while simultaneously moving said spent sulfur oxide-capturing and particulate-removing material substantially upwardly in said lift pipe riser to substantially remove said particulates and said sulfur-containing deposits from said material while emitting effluent gases containing said removed particulates and sulfur-containing material selected from the group consisting of hydrogen sulfide, sulfur-containing deposits, and combinations thereof;

feeding said regenerated sulfur oxide-capturing and particulate-removing material directly to said granular bed filter and scrubber from said lift pipe riser for use as part of said downwardly moving bed;

removing a substantial portion of said particulates from said effluent gases in at least one cyclone;

recovering elemental sulfur from said effluent gases from said lift pipe riser in a sulfur recovery unit; and said sulfur oxide-capturing and particulate-removing material comprising alumina and magnesia.

17. A gas purification process in accordance with claim 16 wherein said alumina and magnesia material has at least one promoter thereon ranging from 2 ppm to 6 ppm by weight selected from the group consisting essentially of platinum, ceria, and combinations thereof.

* * * * *

UNITED STATES PATENT OFFICE
CERTIFICATE OF CORRECTION

Patent No. 4,609,539           Dated   September 2, 1986

Inventor(s)  Horecky, Carl J.  -  Hirschberg, Eugene H.

It is certified that error appears in the above-identified patent and that said Letters Patent are hereby corrected as shown below:

Patent

| Column | Line | | | |
|---|---|---|---|---|
| 3 | 30 | "spend" | should be | -- spent -- |
| 4 | 46 | "redued" | should be | -- reduced -- |
| 9 | 31 | "silicaalumina" | should be | -- silica-alumina -- |
| 9 | 55 | "non-catalytic" | should be | -- noncatalytic -- |
| 15 | 26 | "circustances" | should be | -- circumstances -- |
| 17 | 8 | "0.0117" | should be | -- 0.117 |
| 18 | 44 | "non-oxidative" | should be | -- nonoxidative -- |

Signed and Sealed this

Twenty-second Day of September, 1987

Attest:

DONALD J. QUIGG

Attesting Officer    Commissioner of Patents and Trademarks